US010564922B2

(12) United States Patent
Sitter et al.

(10) Patent No.: US 10,564,922 B2
(45) Date of Patent: Feb. 18, 2020

(54) DISPLAY DEVICE FOR A MOTOR VEHICLE

(71) Applicant: FORD GLOBAL TECHNOLOGIES, LLC, Dearborn, MI (US)

(72) Inventors: Angela Sitter, Bedburg (DE); Julius Maximilian Engelke, Aachen (DE); Patrick Badaru, Pulheim (DE); Clemens J. Marek, Frechen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 15/895,343

(22) Filed: Feb. 13, 2018

(65) Prior Publication Data

US 2018/0232190 A1    Aug. 16, 2018

(30) Foreign Application Priority Data

Feb. 13, 2017   (DE) .................. 10 2017 202 257

(51) Int. Cl.
*G09G 5/00* (2006.01)
*G06F 3/147* (2006.01)
(Continued)

(52) U.S. Cl.
CPC .............. *G06F 3/147* (2013.01); *B60K 35/00* (2013.01); *B60K 37/02* (2013.01); *G06F 3/02* (2013.01); *G06K 9/00087* (2013.01); *G06K 9/00288* (2013.01); *G06K 9/00838* (2013.01); *G09G 5/391* (2013.01); *B60K 2370/12* (2019.05);
(Continued)

(58) Field of Classification Search
CPC ................. G06F 3/147; G06F 3/02; B60K 35/00; B60K 37/02; B60K 2370/736; B60K 2370/151; B60K 2370/52; B60K 2370/77; B60K 2370/18; B60K 2370/12; G09G 5/391; G06K 9/00288; G06K 9/00087; G06K 9/00838
See application file for complete search history.

(56) References Cited

U.S. PATENT DOCUMENTS

2003/0189539 A1    10/2003  Tamura
2010/0097525 A1*   4/2010   Mino ................ H04N 13/31
                                                            348/564
(Continued)

FOREIGN PATENT DOCUMENTS

DE              19753086 A1      3/1999
DE          102004019829 B3      8/2005
(Continued)

OTHER PUBLICATIONS

DE Examination Report for DE 10 2017 202 257.4 dated Sep. 20, 2017, 6 pages.

*Primary Examiner* — Adam R. Giesy
(74) *Attorney, Agent, or Firm* — Brooks Kushman P.C.; Frank Lollo

(57) ABSTRACT

The disclosure specifies a display device for a motor vehicle. The display device has a memory unit that stores visual requirements of vehicle occupants, an identification component that identifies a vehicle occupant, a processing unit that is designed to assign the visual requirements to an identified vehicle occupant and transfer the assigned visual requirements to a display. The display is individually adjustable to visual requirements of a vehicle occupant.

20 Claims, 3 Drawing Sheets

(51) Int. Cl.
  *G06K 9/00*    (2006.01)
  *G09G 5/391*   (2006.01)
  *B60K 37/02*   (2006.01)
  *G06F 3/02*    (2006.01)
  *B60K 35/00*   (2006.01)

(52) U.S. Cl.
  CPC .... *B60K 2370/151* (2019.05); *B60K 2370/18* (2019.05); *B60K 2370/52* (2019.05); *B60K 2370/736* (2019.05); *B60K 2370/741* (2019.05); *B60K 2370/77* (2019.05); *G09G 2320/08* (2013.01); *G09G 2380/10* (2013.01)

(56) References Cited

U.S. PATENT DOCUMENTS

| | | | | |
|---|---|---|---|---|
| 2010/0274570 | A1* | 10/2010 | Proefke | B60L 53/30 |
| | | | | 705/1.1 |
| 2016/0042501 | A1 | 2/2016 | Huang et al. | |
| 2017/0302913 | A1* | 10/2017 | Tonar | H04N 13/366 |
| 2018/0130449 | A1* | 5/2018 | Jeon | B60K 35/00 |

FOREIGN PATENT DOCUMENTS

| | | | |
|---|---|---|---|
| DE | 102006002679 | A1 | 8/2007 |
| DE | 102007025352 | A1 | 12/2008 |
| DE | 102009048937 | A1 | 4/2011 |
| DE | 102012019508 | A1 | 4/2014 |
| DE | 102012020170 | A1 | 4/2014 |
| JP | 2002274218 | A | 9/2002 |
| JP | 2009276943 | A | 11/2009 |

* cited by examiner

DISPLAY DEVICE FOR A MOTOR VEHICLE

CROSS-REFERENCE TO RELATED APPLICATIONS

This application claims foreign priority benefits under 35 U.S.C. § 119(a)-(d) to DE Application 10 2017 202 257.4 filed Feb. 13, 2017, which is hereby incorporated by reference in its entirety.

TECHNICAL FIELD

The disclosure relates to a display device for a motor vehicle, a motor vehicle and a method for individual adjustment of a display.

BACKGROUND

In accordance with demographic development, a number of individuals with restricted visual capacity, for example declining visual acuity, is increasing. Visual aids, such as spectacles or contact lenses, are not always matched satisfactorily to the individual restrictions. Thus, some individuals decide on inexpensive visual aids, which to some extent are matched poorly or even not individually, or use old visual aids with a detrimental influence on the visual capacity.

This leads to the situation where, for example, vehicle drivers can only correctly perceive information depicted on a display device, for example a display, in a restricted manner or increased effort is needed for correct perception. This is associated with a greater risk to the vehicle driver, to further vehicle occupants and other road users, since the vehicle driver does not perceive important information or perceives the same too late or is diverted from the traffic situation during the attempt for a correct perception.

US 2016/0042501 A1 discloses displays, which are adjusted to visual requirements of the viewer (so-called vision correcting display), in that an image to be depicted is optimized digitally in accordance with the needs of the viewer, so that it then appears sharp to the viewer. The use of visual aids is unnecessary.

SUMMARY

It is therefore an object of the present disclosure to specify a possible way with which the problems described can be reduced or even prevented.

It is proposed to form a display device for a motor vehicle in such a way that individual adjustment to visual requirements of a vehicle occupant, for example a vehicle driver, is possible.

For this purpose, a display device according to the disclosure has a memory unit that stores visual requirements of vehicle occupants, an identification component that identifies a vehicle occupant, a processing unit, which is designed to assign the visual requirements to an identified vehicle occupant and transfer the assigned visual requirements to one or more displays, and one or more displays that are individually adjustable to visual requirements of a vehicle occupant.

A display is to be understood as a device that optically signals and displays variable information. Information of this type can be, for example, vehicle and/or travel-relevant information, which is primarily needed by the vehicle driver.

Thus, a display can depict, for example, a speed, a distance travelled, a fuel supply or switching on and off of control lamps for turn signals, main beams, brake lights, etc., a planned route (navigation display) or an image from a camera directed toward the roadway, for example the camera of a parking assistant.

However, a display can also signal and depict further information primarily relevant to the remaining vehicle occupants, for example entertainment programs such as films, games, etc.

The display can be formed, for example, as a direct display (e.g. LCD, OLED) and/or indirect display (head-up display).

Visual requirements of a vehicle occupant, for example a vehicle driver, are understood to be those conditions relating to vision that have to be fulfilled in order that depicted information can be perceived clearly and explicitly with little effort, for example in order that a display can be perceived sharply.

Individually adjustable means that the display can be matched to the requirements of the actual vehicle occupant. If the vehicle occupant changes, or the visual requirements of the same vehicle occupant change, renewed adjustment of the display is possible.

The display can, for example, be continuously adjustable. The display can be formed in such a way that simple adaptation to the visual requirements is possible without structural changes, in that the adaptation is carried out electronically. For instance, it is possible to use software in order to show a display in accordance with the visual requirements. For instance, the adaptation can be carried out as described in US 2016/0042501 A1.

According to one design variant, the display can be individually adjustable to the visual acuity of a vehicle occupant. Visual acuity (vision) designates an extent to which the vehicle occupant is able to perceive patterns and contours with his eyes. If visual acuity is reduced, for example lower than an usual visual acuity of a human from the corresponding age group or lower than a limiting value to be defined (e.g. a vision of 0.7), the display can be matched thereto in such a way that a desired sharp visual impression of the display is achieved.

For example, the display can be designed to be adjustable individually to long-sightedness and/or short-sightedness and/or to an astigmatism and/or an optical axis of the eyes of a vehicle occupant.

Long-sightedness (hyperopia) or short-sightedness (myopia) are caused by axial refraction errors of the eye, since the eyeball is too short in relation to a refractive power or has too low a refractive power (long-sightedness) or is too long, or has too high a refractive power (short-sightedness). This leads to a sharp visual impression not being produced in all perception ranges. While in the case of long-sightedness, primarily objects located close to the eye appear blurry, in the case of short-sightedness this applies to objects far removed from the eye.

Astigmatism designates a refraction error of the eye because of which light beams originating from a viewed object are not focused at a point on a retina, but are imaged in a focal line. The astigmatism can be associated with a reduction in visual acuity.

The optical axis of the eye is the axis that is normal to a front surface of a cornea of which an extension into an interior of the eye has a shortest distance from centers of curvature of remaining refractive areas. Expressed in another way, the optical axis is a straight line on which the centers of curvature of the cornea and of two lens surfaces and a combined nodal point of a reduced eye are located. The optical axis of the eye extends approximately through a center of a pupil.

The memory unit serves to store visual requirements of vehicle occupants. It can be located in the motor vehicle itself, for example, or else arranged externally and be located, for example, on an automobile key or in a mobile terminal.

The identification component serves to identify the vehicle occupant to whose visual requirements the display is to be adjusted individually. In one refinement, one or more switches, for example pushbuttons, can be provided for one or more vehicle occupants in the motor vehicle, so that the identification can be carried out by actuating an appropriate switch.

Furthermore, the device according to the disclosure has a processing unit, which assigns the visual requirements to the identified vehicle occupant and transfers the assigned visual requirements to a display.

The processing unit can likewise either be arranged in the vehicle itself or externally. There is also the possibility of dividing up the processing unit into several modules, so that, for example, the assignment of the visual requirements to the identified vehicle occupant is carried out on a first, for example external, module of the processing unit, while the assigned visual requirements are retrieved from the first module by a second module of the processing unit, for example arranged in the vehicle, and are transferred to the display.

The data can be transferred to the display, for example, in a cabled or cable-free manner, for example by radio transmission.

According to various design variants, the identification component can be formed as a motor vehicle key or mobile terminal or arranged on a motor vehicle key or mobile terminal.

For example, it is possible to use a personal motor vehicle key that, when inserted into the ignition lock or when starting the ignition process, serves to identify the motor vehicle driver. The motor vehicle key can be, for example, a programmable automobile key, for example a "MyKey" from the automobile manufacturer Ford.

Alternatively, a mobile terminal, for example a Smartphone or a wearable, i.e. a computer system, which is fixed to the body during use, can be used for the identification. Suitable software can be used for this purpose.

According to various design variants, the memory unit and/or the processing unit can be arranged on a motor vehicle key or a mobile terminal. For example, the visual requirements of the vehicle driver or further vehicle occupants can be stored on a programmable automobile key, for example in a "MyKey" from the automobile manufacturer Ford, a Smartphone or a wearable.

If, for example, such a motor vehicle key is used to start the motor vehicle, the visual requirements can be transmitted to the display, which is accordingly individually adjusted.

If the visual requirements of the vehicle driver are stored on the motor vehicle key or the mobile terminal, an individual adjustment of the display to their individual visual requirements can be carried out without any intervention by the vehicle driver, i.e. automatically. If the visual requirements of several persons are stored on the motor vehicle key or mobile terminal, then selection of an actual person can be made via the identification component.

For example, for the case in which the processing unit is also arranged on the motor vehicle key or mobile terminal, there is additionally the possibility that the visual requirements are already transmitted to the display as the motor vehicle is opened, so that said display can already be adjusted individually to the visual requirements before a starting operation.

According to various design variants, the identification component can be formed as a voice-controlled communication system and/or the processing unit can be controllable via a voice-controlled communication system.

A voice-controlled communication system is to be understood to mean a system for the integration of mobile terminals and storage media, which can be operated under voice control. The identification and/or control of the processing unit in this case can be carried out via voice commands, which the vehicle occupant gives.

For example, a "SYNC" system from the automobile manufacturer Ford can be used as a voice-controlled communication system. According to various design variants, the identification component can be formed as a face scanner or fingerprint sensor.

The display of a display device having the features described can be formed, for example, as a display of a dashboard of a motor vehicle. A dashboard is to be understood to mean a display or instrument panel having measuring indicators and operating levers, which is usually arranged above the steering wheel.

A dashboard has multiple displays which, amongst other things, display vehicle-relevant and safety-relevant information, such as speed, temperature, and rotational speed. For this information, it is frequently particularly important that it can be detected quickly, for example in order to be able to determine an increased speed.

Here, the use of a display that is individually adjustable to the visual requirements can permit simple and rapid detection of the information displayed and therefore improve the safety of the vehicle occupants and remaining road users.

Alternatively, the display of the display device can be formed as a display for a vehicle occupant on a rear seat of the motor vehicle. This can be, for example, a display on which an entertainment program is depicted. The display can be arranged, for example, on or in a headrest of front seats.

Since such displays frequently have small dimensions for reasons of space, an individual adjustment to the visual requirements of the vehicle occupant is particularly important here.

According to various design variants, the display of the display device can be formed as a multi-view display such as a dual-view display, for example, that is to say as a display on which two different displays are depicted on a screen, wherein only one display is visible in each case from a specific viewing angle. For example, it is possible, on the same display, firstly to display a navigational display for the vehicle driver, while the passenger, on the other hand, can view a movie on the same screen.

Such a multi-view display can be individually adjustable to the visual requirements of several vehicle occupants. For example, the display provided for the vehicle driver can be adjusted individually to his visual requirements, while the display provided for the passenger is individually adjustable to the visual requirements of the passenger.

According to various design variants, the display device can also have a manual controller, which can be used for the fine adjustment of the display. Such a controller can, for example, be located in the vicinity of the display and, for example, be formed as a rotary control.

As a result, for example, deviations of the actual visual requirements of the vehicle occupant, dependent on daily status and health status, from the stored visual requirements of said vehicle occupant can be taken into account and, overall, improved adjustment of the display to the visual requirements of the vehicle occupant can be achieved.

The display device can additionally have an advice module which, in accordance with specific criteria, prompts the user to have his eyesight checked and/or to check the display adjustment to see whether it still corresponds to his visual requirements. The advice module can include a software algorithm that controls said automated advice, for example on the basis of statistical data. Thus, the advice can be output, for example, after a time period in which, viewed statistically, eyesight of a human changes.

A motor vehicle according to the disclosure, for example a passenger car, motorcycle or a tractor, has one or more of the display devices described previously.

A method according to the disclosure for individual adjustment of one or more displays for a motor vehicle to visual requirements of a vehicle occupant has the following steps: providing visual requirements of vehicle occupants, identifying a vehicle occupant, assigning the visual requirements to the identified vehicle occupant, transferring the assigned visual requirements to one or more displays, adjusting the displays to the transferred visual requirements.

The method according to the disclosure can be implemented, for example, by a device according to the disclosure. Otherwise, with regard to the definition of various terms and the relationship of the individual method steps, reference is made to the above explanations relating to the device. According to various design variants, the visual requirements of a vehicle occupant can be provided on a motor vehicle key or mobile terminal and/or the vehicle occupant can be identified by means of a motor vehicle key or a mobile terminal and/or the visual requirements can be assigned to the identified vehicle occupant by a motor vehicle key or a mobile terminal and transferred to the display.

According to various design variants, the vehicle occupant can be identified by a voice-controlled communication system and/or the processing unit can be controlled by a voice-controlled communication system.

According to various design variants, the method can also have manual fine adjustment of the display by a manual controller.

The method can additionally comprise prompting the user to have his eyesight checked and/or to check the display adjustment to see whether it still corresponds to his visual requirements.

The disclosure is to be explained in more detail below by using exemplary embodiments, wherein reference is made to the appended drawings, which form part of said disclosure and in which specific embodiments in which the disclosure can be practiced are shown for illustration. In this regard, directional terminology such as "top", "bottom", "forward", "rearward", "front", "rear" and so on are used with reference to the orientation of the figures described, if not otherwise specified. Since components of embodiments can be positioned in a number of different orientations, directional terminology is used for illustration and is in no way restrictive.

It goes without saying that other embodiments can be used and structural, or logical changes can be made without departing from the protected scope of the present disclosure. It goes without saying that the features of the various exemplary embodiments described herein can be combined with one another, if not specifically otherwise specified. The following extensive description is therefore not to be understood in the restrictive sense, and the protected scope of the present disclosure is defined by the appended claims.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
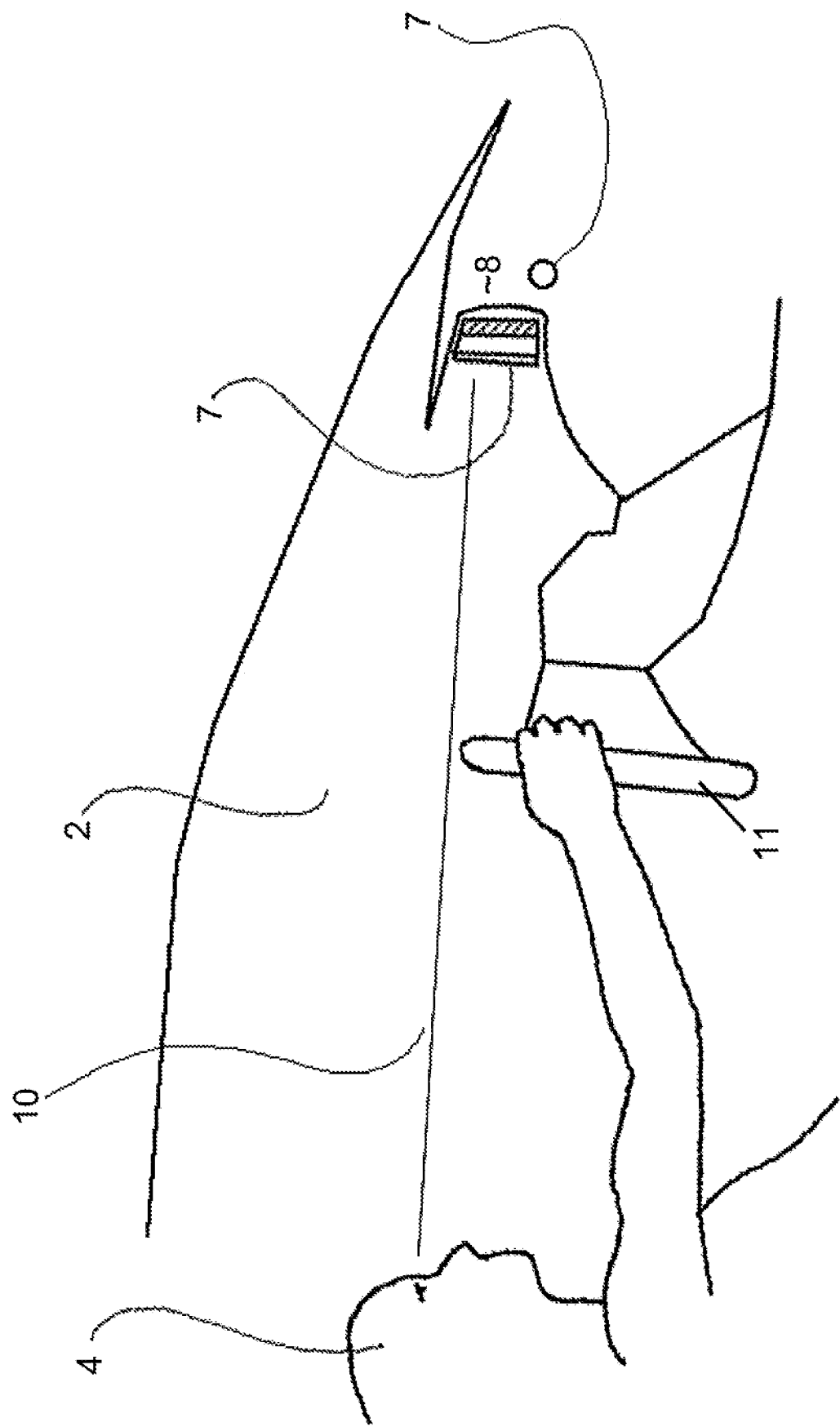
FIG. 1 shows a schematic illustration of a display device according to the disclosure in a motor vehicle, according to a first exemplary embodiment.

According to a first exemplary embodiment, a display device 1 according to the disclosure is formed as a display 7 of a dashboard 8 of a motor vehicle 2, the motor vehicle 2 being a passenger car. The associated FIG. 1 shows, schematically, part of the motor vehicle 2 and a vehicle occupant 4, who may be a vehicle driver and whose eyes are directed toward the display 7. A viewing direction 10 of the vehicle occupant 4 extends in a direction of the dashboard 8 with the display 7 of the display device 1, which, in the view of the vehicle occupant 4, is located behind a steering wheel 11.

The display 7 can depict vehicle-relevant and travel-relevant information, which means that it shows, for example, a speed, a fuel supply and a route traveled. The display 7 is individually adjustable to the visual requirements of the vehicle occupant 4, wherein a manual controller 9, which in the example is likewise arranged on the dashboard 8 beside the display 7, can be used for fine adjustment.

The display 7 can be adjusted in accordance with long-sightedness or short-sightedness and/or an astigmatism and/or the optical axis of the eyes of the vehicle occupant 4.

In addition to the display 7, the display device 1 comprises a memory unit 3 and a processing unit 6—, which in the exemplary embodiment are arranged on a programmable automobile key. In addition, the identification component 5 is formed as a programmable automobile key, i.e. the vehicle driver is identified by using the automobile key used by said driver.

The visual requirements of the vehicle driver are stored in the memory unit 3. As a door (not shown) of the motor vehicle 2 is opened, or, alternatively, as an engine (not shown) of the motor vehicle 2 is started, the visual requirements of the vehicle driver are transferred to the display 7, which is accordingly individually adjusted.

Alternatively, the processing unit 6 can comprise two modules, of which the first module is located on a programmable automobile key and is used to assign the visual requirements to the identified vehicle driver. The second module of the processing unit 6 is located in the motor vehicle 2 and retrieves the visual requirements of the vehicle driver from the first module of the processing unit 6 as the door of the motor vehicle 2 is opened or as the engine is started and transfers said requirements to the display 7.

Using the individual adjustment of the display 7 of the display device 1 to the visual requirements of the vehicle occupant 4, improved detectability of the displays on the display 7 can be made possible. Amongst other things, this contributes to increasing driving and traffic safety, since the vehicle occupant 4 can simply perceive the information depicted and thus, when viewing the display 7, is diverted only minimally from traffic events.

Figure 2:
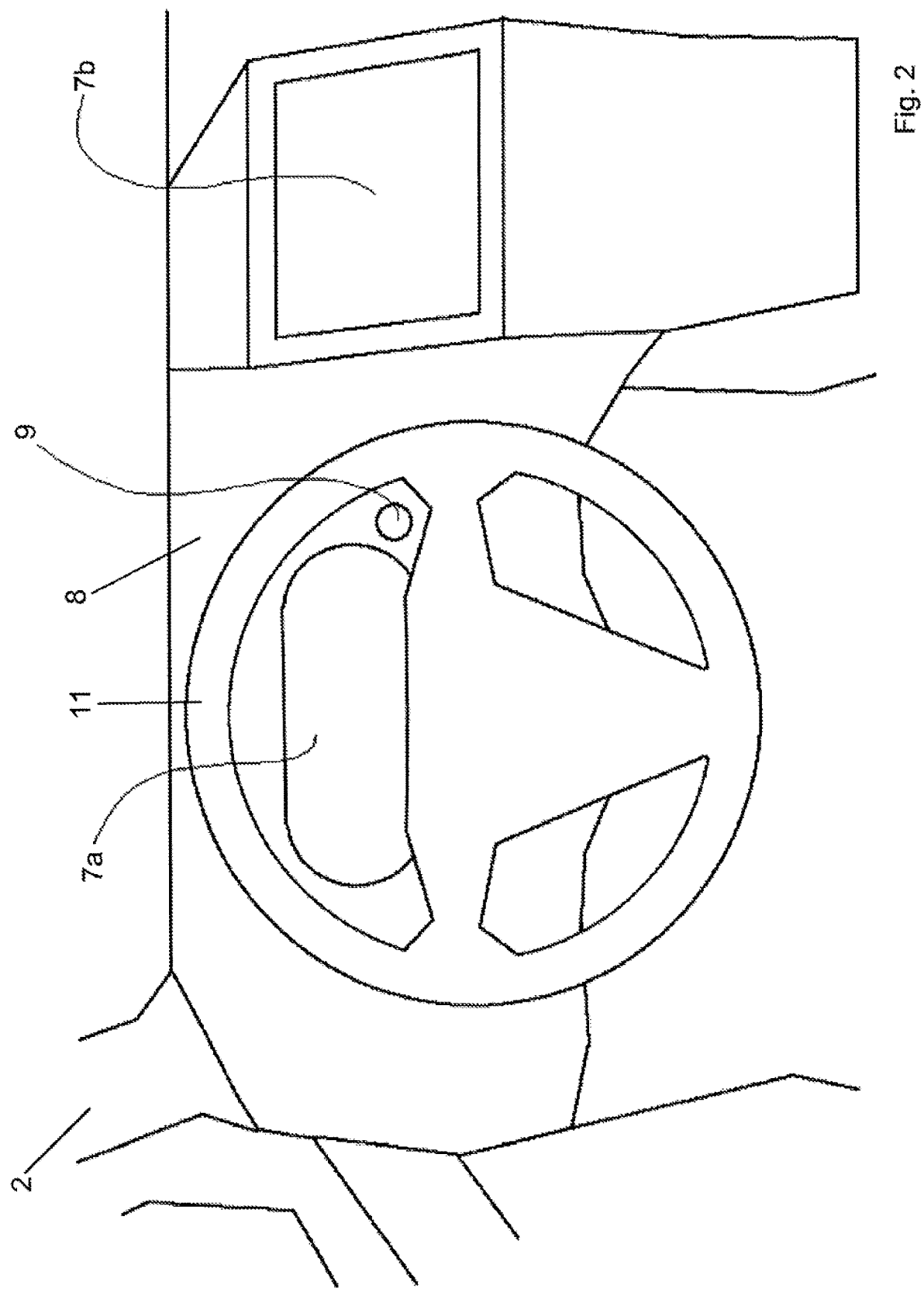
FIG. 2 shows a schematic illustration of display device according to the disclosure in a motor vehicle, according to a second exemplary embodiment.

According to a second exemplary embodiment (FIG. 2), there is a display device according to the disclosure with two displays 7a and 7b in a motor vehicle 2. The display 7a is, as in the first exemplary embodiment, a display 7 of the dashboard 8 which is located behind the steering wheel 11 and which, as described in relation to the first exemplary embodiment, is individually adjustable to the visual requirements of a vehicle occupant 4.

In addition, the motor vehicle 2 has a second display 7b, which is arranged on the right beside the dashboard 8 and is formed as a dual-view display. The display 7b can display two different displays, a first display, for example a navigational display, which can be detected by the vehicle driver, i.e. from the seat arranged in front of the steering wheel 11, and a second display, for example an entertainment program, which can be seen by a passenger, i.e. from the passenger seat.

The first display 7a of the dual-view display can be individually adapted to the visual requirements of the vehicle driver, i.e. the display provided for the vehicle driver is individually adjustable in accordance with the visual requirements of the vehicle driver. Optionally, it is possible to adjust the second display individually in accordance with the visual requirements of the passenger.

For the individual adjustment of the display 7a arranged behind the steering wheel 11 and the first display of the display 7b that is provided for the vehicle driver, the memory unit 3 and the processing unit 6 can be arranged on a programmable automobile key.

The display 7 can additionally be assigned an advice module having a software algorithm which, on the basis of statistical data, for example, determines whether a change in the eyesight of the user is to be expected since the last adjustment of the display 7. If yes, the user is prompted by the advice module to have his eyesight checked and/or to check the display adjustment to see whether it still corresponds to his eyesight. The prompt can be implemented as a signal depicted on the display 7, for example as a text communication depicted on the display. Alternatively, it can also be implemented as an acoustic signal, for example in the form of a voice output.

For the individual adjustment of the second display of the display 7b, which is provided for the passenger, the processing unit 6 can be controllable by a voice-controlled communication system.

Figure 3:
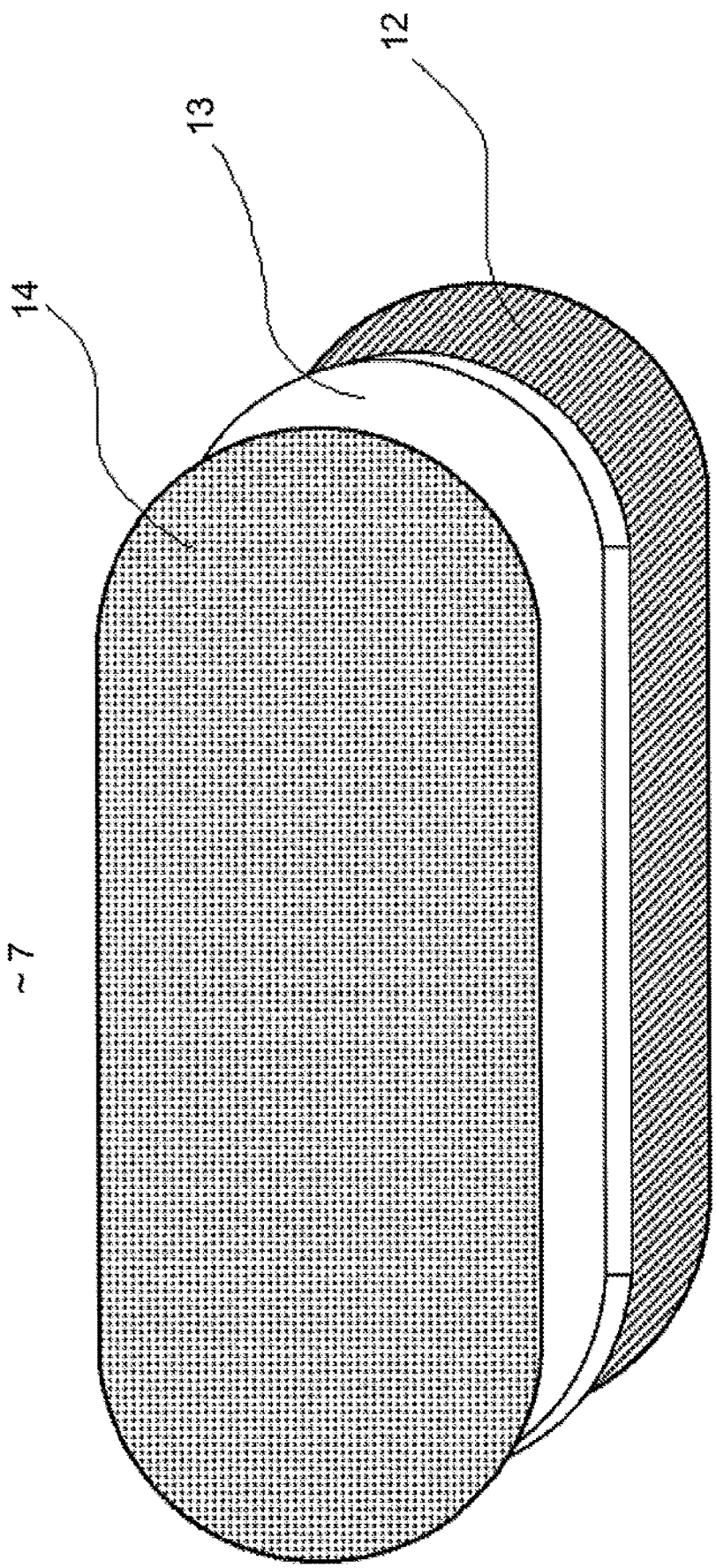
FIG. 3 shows a schematic illustration of a display of a display device according to the disclosure.

In FIG. 3, the display 7 of a display device 1 that can be adjusted individually to the visual requirements of a vehicle occupant 4 is illustrated schematically. This display 7 is constructed in three parts and has a display element 12, a spacer 13, and a shadow mask 14. The function corresponds to the function of the display described in US 2016/0042501 A1.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A display device for a motor vehicle comprising:
a memory unit that stores visual requirements of vehicle occupants, the visual requirements including at least one of a refraction error of an associated eye and an optical axis of the associated eye of the occupant;
an identification component that identifies an identified occupant;
a processing unit designed to assign the visual requirements to the identified occupant, and transfer the visual requirements for the identified occupant to one or more displays, wherein the one or more displays are individually adjustable to the visual requirements of the identified occupant; and
an advice module configured to, in response to specific criteria indicative of axial refraction errors associated with an eye of the identified occupant, prompt the identified occupant to check display adjustments that correspond to the visual requirements.

2. The display device as claimed in claim 1, wherein the identification component is arranged on a motor vehicle key.

3. The display device as claimed in claim 1, wherein the identification component is arranged on a mobile terminal.

4. The display device as claimed in claim 1, wherein the memory unit and the processing unit are arranged on a motor vehicle key.

5. The display device as claimed in claim 1, wherein the memory unit and the processing unit are arranged on a mobile terminal.

6. The display device as claimed in claim 1, wherein the identification component is a voice-controlled communication system, wherein the processing unit is controllable by the voice-controlled communication system.

7. The display device as claimed in claim 1, wherein the identification component is a face scanner or fingerprint sensor.

8. The display device as claimed in claim 1, wherein the identification component is a fingerprint sensor.

9. The display device as claimed in claim 1, wherein the one or more displays are each formed as a display of a dashboard of the motor vehicle.

10. The display device as claimed in claim 1, wherein the one or more displays are formed on a rear seat of the motor vehicle.

11. The display device as claimed in claim 1, wherein the one or more displays are formed as multi-view displays.

12. The display device as claimed in claim 1 further comprising a manual controller that finely adjusts the display.

13. A vehicle comprising:
a processing unit arranged on a mobile terminal that is designed to, in response to detection of an identified occupant via a fingerprint scanner and assigned visual requirements stored in a memory unit for the identified occupant, adjust a display according to the visual requirements stored on the memory unit; and
an advice module configured to, in response to specific criteria indicative of axial refraction errors associated with an eye of the identified occupant, prompt the identified occupant to check display adjustments that correspond to the visual requirements.

14. The vehicle as claimed in claim 13 further comprising a manual controller that finely adjusts the display.

15. The vehicle as claimed in claim 13, wherein the visual requirements include at least one of a refraction error of an associated eye and an optical axis of the associated eye of the occupant.

16. A method to adjust a display device for a vehicle comprising:
    providing visual requirements of vehicle occupants to a memory unit;
    identifying a vehicle occupant using a face scanner;
    assigning visual requirements to the identified vehicle occupant to a processing unit;
    transferring the visual requirements from the processing unit to one or more displays; and
    adjusting the displays via the processing unit based on the visual requirements for the vehicle occupant identified by the face scanner; and
    prompting the occupant to check display adjustments based on detected axial refraction errors associated with an eye of the occupant.

17. The method as claimed in claim 16, wherein the memory unit is provided on a vehicle key such that the vehicle occupant is identified by the key and the visual requirements are assigned to the vehicle occupant via the key.

18. The method as claimed in claim 16 further comprising controlling the processing unit with a voice-controlled communication system.

19. The method as claimed in claim 16 further comprising manually providing fine adjustment of the displays via a manual controller.

20. The display device as claimed in claim 16, wherein the visual requirements include at least one of a refraction error of an associated eye and an optical axis of the associated eye of the occupant.

* * * * *